United States Patent
Blomet et al.

(10) Patent No.: US 11,040,328 B2
(45) Date of Patent: Jun. 22, 2021

(54) SOLID DECONTAMINATION COMPOSITION

(71) Applicant: PREVOR INTERNATIONAL, Paris (FR)

(72) Inventors: Joël Blomet, Valmondois (FR); Marie-Claude Meyer, Paris (FR); Aurélien Duval, Paris (FR)

(73) Assignee: PREVOR INTERNATIONAL, Paris (FR)

( * ) Notice: Subject to any disclaimer, the term of this patent is extended or adjusted under 35 U.S.C. 154(b) by 108 days.

(21) Appl. No.: 16/095,953

(22) PCT Filed: Apr. 21, 2017

(86) PCT No.: PCT/FR2017/050950
§ 371 (c)(1),
(2) Date: Oct. 24, 2018

(87) PCT Pub. No.: WO2017/187060
PCT Pub. Date: Nov. 2, 2017

(65) Prior Publication Data
US 2019/0134600 A1 May 9, 2019

(30) Foreign Application Priority Data
Apr. 25, 2016 (FR) .................. 16 53618
Nov. 4, 2016 (FR) .................. 16 60716

(51) Int. Cl.
B01J 20/24 (2006.01)
B01J 20/10 (2006.01)
B01J 20/26 (2006.01)
B01J 20/28 (2006.01)
B01J 20/30 (2006.01)
C09K 3/32 (2006.01)

(52) U.S. Cl.
CPC ............ *B01J 20/103* (2013.01); *B01J 20/24* (2013.01); *B01J 20/261* (2013.01); *B01J 20/262* (2013.01); *B01J 20/2803* (2013.01); *B01J 20/28004* (2013.01); *B01J 20/28016* (2013.01); *B01J 20/3028* (2013.01); *B01J 20/3042* (2013.01); *C09K 3/32* (2013.01); *B01J 2220/46* (2013.01)

(58) Field of Classification Search
None
See application file for complete search history.

(56) References Cited

U.S. PATENT DOCUMENTS

| | | | | |
|---|---|---|---|---|
| 6,294,118 | B1 * | 9/2001 | Huber | A01K 1/0152 119/173 |
| 6,382,132 | B1 * | 5/2002 | Steckel | A01K 1/0152 119/171 |
| 2002/0038633 | A1 * | 4/2002 | Hayakawa | A01K 1/0154 119/171 |
| 2004/0025798 | A1 * | 2/2004 | Lee | A01K 1/0154 119/172 |
| 2004/0074450 | A1 * | 4/2004 | Soares | A01K 23/00 119/850 |
| 2004/0112297 | A1 * | 6/2004 | Rasner | A01K 1/0155 119/172 |
| 2004/0146444 | A1 * | 7/2004 | Dokter | A01K 1/0152 423/335 |
| 2009/0028915 | A1 * | 1/2009 | Code | A01N 25/08 424/402 |
| 2009/0163888 | A1 | 6/2009 | Arehart et al. | |
| 2011/0174228 | A1 * | 7/2011 | Liu | A01K 1/0154 119/173 |
| 2013/0199456 | A1 * | 8/2013 | Bracilovic | A01K 1/0154 119/173 |
| 2015/0299546 | A1 | 10/2015 | Neel et al. | |
| 2017/0127644 | A1 * | 5/2017 | Provenzano | A01K 1/0154 |
| 2017/0245460 | A1 * | 8/2017 | Lipscomb | A01K 1/0152 |
| 2017/0339914 | A1 * | 11/2017 | Fritter | B01J 20/28097 |

FOREIGN PATENT DOCUMENTS

| | | | | |
|---|---|---|---|---|
| FR | 2 998 578 | A1 | 5/2014 | |
| GB | 2296215 | A * | 6/1996 | ............ B29B 9/14 |

OTHER PUBLICATIONS

International Search Report, dated Jul. 3, 2017, from corresponding PCT/FR2017/050950 application.

* cited by examiner

Primary Examiner — Chester T Barry
(74) Attorney, Agent, or Firm — Nixon & Vanderhye

(57) ABSTRACT

The invention relates to a solid composition which comprises at least one amorphous silica gel, at least one cellulosic agent, at least one binder, and optionally at least one neutralizing agent, and is characterized in that the solid composition has a grain size of 100 μm to 2 mm.

15 Claims, No Drawings

SOLID DECONTAMINATION COMPOSITION

FIELD OF THE INVENTION

This invention relates to a depollution composition and its use to counter chemical pollution provoked by untimely spills of all types of liquids.

Nowadays, we are increasingly exposed to chemical pollution in our environment.

If an accident occurs, these chemical pollutants potentially cause pollution and security problems at different scales. For example, a road accident of a truck carrying toxic or hazardous raw materials can provoke environmental pollution or damage on the road. In industry and in the laboratory, a manipulation error of a drum containing a toxic or hazardous raw material can provoke personal injuries or cause damage to equipment. Therefore fast control over pollution is essential in many situations. In such emergency situations, it is preferable to have a product available capable of irreversibly absorbing and neutralising any type of polluting liquid and that can thus declassify some acids and bases forming said polluting liquid into non-hazardous waste.

PRIOR ART

Many multi-purpose compositions are used to counter chemical pollution.

Natural dried minerals such as sepiolite, diatomaceous earth, sand and vermiculite have been used conventionally. However, these minerals generate large quantities of waste to be stored or treated are difficult to reuse for energy. Furthermore, such dried natural minerals often have a small proportion of crystalline silica that has been recognized as being carcinogenic by the IARC (International Agency for Research on Cancer).

Sawdust has also been used. However, the IARC considers dust from sawdust as being Class 1 carcinogenic particles. Furthermore, sawdust reacts with sulphuric acid to form a sticky black oil that is difficult to dispose of.

Major developments have been made with absorbent compositions containing amorphous silicic acid (Chemizorb®) in recent years. However, large quantities of these compositions are necessary to absorb liquid and the product leaves a thin liquid film on the ground.

A composition comprising a super-absorbent polymer and silica has also been marketed under the trade name Unisafe®. This composition does not involve a dangerous reaction but it is quite expensive and the resulting product leaves a thin liquid film on the ground.

A compound containing amorphous silicic acid and an agent derived from wood has also been marketed by the Prevor company. This absorbent is efficient and leaves the ground free of any residual liquid but tends to be unpleasant for its user. Due to its small granulometry, very large amounts of dust appear in suspension during use that can cause discomfort for the user's respiratory tracts. Furthermore, due to its small granulometry, this type of composition is very volatile and therefore very sensitive to the wind that makes it very difficult to use outdoors.

Thus, at the present time, there is no depollution composition that:

(1) is non-irritating,
(2) enables absorption of all types of liquid pollutants,
(3) is not harmful or hazardous during its use,
(4) forms a residue with the pollutant that is easy to collect,
(5) does not leave any residue on the ground,
(6) enables depollution and collection of residues obtained at low cost,
(7) does not cause discomfort to the user during use,
(8) can be used outdoors,
(9) can neutralize the absorbed polluting liquid if necessary, and
(10) can irreversibly transform some acids and some bases forming said liquid pollutant into non-hazardous waste, and particularly into ordinary industrial waste (OIW).

Indeed, these ten criteria can be contradictory. However, these inventors have the merit of finding a depollution composition with the required granulometry that offers an excellent compromise between these various criteria (1)-(10).

SUMMARY OF THE INVENTION

Thus, the invention relates to a solid composition comprising:

(a) at least one amorphous silica gel,
(b) at least one cellulose agent,
(c) at least one binding agent, and
(d) optionally at least one neutralising agent, characterized in that it has a granulometry ranging from 100 µm to 2 mm.

It also relates to a method of manufacturing said composition that includes a step of wet granulation of amorphous silica gel, the cellulose agent, optionally at least one neutralising agent and optionally at least one additive, in the presence of the binding agent.

It also relates to a depollution method using said composition and comprising the following steps:

(1) add the composition on a polluting liquid;
(2) wait until the polluting liquid has been absorbed;
(3) optionally check the pH of the residue obtained in step 2;
(4) repeat steps 1 to 3 until the polluting liquid has been completely absorbed and a solid residue has been formed; and
(5) collect the residue.

It also relates to the use of said composition to absorb spills of paint, stains, chemicals such as acids and bases, oils, hydrocarbons, solvents and aqueous products.

Examples of solvents include but are not limited to water, ethanol, le benzene, hexane, cyclohexane, dichloromethane, chloroform, tetrahydrofurane, toluene, acetone, acetonitrile, ethyl acetate, ethyl ether, pentane, dimethylsulfoxide (DMSO), dimethylformamide (DMF), xylene and mixtures thereof.

DETAILED DESCRIPTION

The composition according to the invention is a solid composition comprising:

(a) at least one amorphous silica gel,
(b) at least one cellulose agent,
(b) at least one binding agent, and
(d) optionally at least one neutralising agent, characterized in that it has a granulometry ranging from 100 µm to 2 mm.

Granulometry measurements are made by vibration sieving.

The composition according to the invention is a depollution composition, in other words a composition that enables complete absorption of chemical pollutants and retention of them.

"Absorb" and "absorption" solidifying the pollutant that was initially in liquid form, by mixing it with the depollution composition.

The composition of this invention is in granulated solid form, and therefore it can be easily spread around or on the polluting liquid. The efficiency of said composition increases as the quantity necessary to absorb the polluting liquid reduces.

The depollution composition according to the invention can absorb liquids using a minimum quantity of product at a lower cost than products according to the state of the art.

The absorption capacity of a compound (or the depollution composition) is expressed in L/kg and corresponds to the quantity by weight of the compound (or the depollution composition) that has to be added to 1 L of water so that the resulting mixture is entirely transformed into solid form.

Therefore it can be measured as follows:

1) 1 L of water is added into a receptacle, preferably made of glass;
2) A determined quantity of the composition of this invention is added into said receptacle;
3) Once the mixture has been homogenized, the state (liquid or solid) of the mixture is verified. Steps 1) and 2) are repeated until a solid residue is obtained;
4) The quantity in kg of added compound or depollution composition corresponds to the absorption capacity of said compound or said composition in kg/L.

According to one particular embodiment of this invention, said composition has an absorption capacity of 1 L to 5 L for 1 kg of said composition, preferably from 1.5 L to 4.5 L for 1 kg of said composition, and more preferably from 2 L to 4 L for 1 kg of said composition.

The composition according to the invention can also neutralize the absorbed polluting liquid if necessary.

"Neutralize" means correcting the pH of the mixture of the pollutant/depollution composition to a value of 5.5 to 9, or even 6 to 8, and particularly 7.

Thus, in a preferred embodiment, the composition according to the invention also comprises a neutralising agent that irreversibly corrects the pH of the final residue to a pH close to neutral pH.

The residue obtained after application of said composition on the liquid that provoked the pollution must be easy to collect. "Easy to collect" means that the characteristics of the residue obtained are such that there is no particular technical difficulty during collection and that the collection operation can be performed by means used routinely by the person skilled in the art. Thus, the residue obtained by use of the composition according to the invention is neither viscous nor sticky, it is in the form of a solid gel, that can easily be removed by means routinely used by the person skilled in the art, such as for example using a shovel or by vacuum cleaning, etc., without leaving any residue stuck to the surface on which the liquid was spread, but leaving a particularly dry and non-slippery ground.

The composition of this invention is not hazardous in the sense of the environment code (non-toxic, non-irritating, non-allergic, and non-ecotoxic), unlike some products currently marketed. Thus, the composition according to this invention does not contain any ingredient requiring particular labelling.

Furthermore, during use, the composition has no harmful or dangerous effect. Therefore it can be manipulated with no risk. When it comes into contact with low concentrations of acid or basic pollutants, it does not cause an excessively exothermal reaction, in other words reaction at a level at which the temperature increase would damage the surrounding medium.

Furthermore, there is no release of toxic gas related to the reaction of the composition with the spilled chemical product.

The total depollution cost is low due to the minimum quantity of said composition used. Note that the total depollution cost includes not only the cost of raw materials and manufacturing of the composition, but also the cost of residue collection and storage or treatment operations of residues (particularly incineration), which is why it is useful to obtain a waste that is easily collected and in low quantity by mass. Due to its high absorption capacity, the quantity of the depollution composition used to counter chemical pollution is small. The result is that the quantity and therefore the mass of waste formed that have to be stored and/or treated are minimal. Moreover, in comparison with products currently marketed, the composition according to the invention as a much higher absorption capacity.

The composition also has the advantage of having a controlled granulometry. The granulometry of the composition is one of the most important parameters because when the granulometry of the composition is too fine (<100 µm), the particles that come into suspension are considered to be dust and therefore can be inhaled.

Dust is more dangerous when the granulometry is finer, because the particles will penetrate more deeply into the organism.

Thus between 10 and 100 µm particles are called total dust and will be retained in the nasal cavities.

Between 5 and 10 µm, dust enters the trachea, the bronchial tubes and then the bronchioles.

Between 0.5 and 5 µm, very fine dust settles on the pulmonary alveoli.

Below 0.5 µm, dust behaves like a gas in the organism and therefore follows pulmonary ventilation.

Therefore a large granulometry avoids the formation of dust and thus makes the user more comfortable and safer.

Furthermore, controlled granulometry prevents the product from being too volatile, it then becomes less sensitive to wind and can be used outdoors. For example, German standard DWA-A 716-9 requires a composition with a granulometry larger than 355 µm for a product to be used on the roads.

The granulometry of said composition is 100 µm to 2 mm. Thus, the composition is not inhaled and does not penetrate into its user's respiratory tracts. Therefore the user is more comfortable and safer. Furthermore, the composition according to the invention can be used outdoors for different applications.

According to one particular embodiment, the composition has a granulometry ranging from 160 µm to 355 µm.

According to another particular embodiment, the composition has a granulometry ranging from 160 µm to 1 mm.

According to another particular embodiment, the composition has a granulometry ranging from 355 µm to 2 mm.

The composition according to this invention can also irreversibly transform some acids and bases forming said polluting liquid and therefore declassify the residue formed into a non-hazardous waste, and particularly into ordinary industrial waste (OIW). Thus, the waste retreatment cost is lower and the safety of employees manipulating residues formed with the depollution composition after absorption of the polluting liquid is increased.

In one particular embodiment, the use of pH indicators in said depollution composition assures that the waste obtained is OIW waste.

Thus, in one particular embodiment, if the colour of the residue formed after the polluting liquid has been absorbed indicates acid-basic neutrality, in other words is yellow, then the residue is an OIW waste.

Examples of pollutants adapted to reclassification as OIW include some acid-basic products that are only corrosive or irritants and that are neither inflammable, nor toxic, nor classified as CMR substances.

Examples of acid-basic chemical products adapted to reclassification as OIW include but are not limited to acids such as hydrochloric acid, sulphuric acid and acetic acid, and bases such as caustic soda, caustic potash and liquid lime.

Therefore the advantage of this invention is that it can give a composition that enables efficient, versatile absorption at low cost, with no danger, that can be used in all outdoor environments, that does not cause any discomfort for the user and that can irreversibly transform some polluting acid or basic liquids into OIW waste once absorbed by said depollution composition.

According to one particular embodiment of this invention, said composition has a density of 125 to 275 g/L, preferably from 150 to 250 g/L and even more preferably from 160 to 240 g/L.

(a) Amorphous Silica Gel.

The amorphous silica gel used in the composition according to the invention is a polymer of amorphous synthetic silica prepared from sodium silicate. The amorphous silica gel is known particularly as a food additive called E551.

The amorphous silica gel particles are porous. The specific structure of the amorphous silica gel makes it possible to absorb liquid to be depolluted and to obtain a non-sticking residue that is easy to collect.

According to one particular embodiment of this invention, said amorphous silica gel has a granulometry ranging from 60 to 500 μm, preferably from 120 to 400 μm and even more preferably from 150 to 300 μm. Said amorphous silica gel also has a density of 150 to 400 kg/m$^3$, preferably from 200 to 380 kg/m$^3$, and even more preferably from 250 to 350 kg/m$^3$. Such granulometry and such density can optimize depollution efficiency.

Thus, said amorphous silica gel has an absorption capacity of 1 L to 10 L for 1 kg, and preferably from 2 L to 4 L for 1 kg.

Such an amorphous silica gel is marketed for example under the trademark Tixosil (particularly Tixosil 68®) produced by Solvay, Upasil (particularly Upasil 60®) produced by Upagchem. Silica gel for chromatography sold by Aldrich, VWR, Accros can also be used. Tixosil 68® absorbs about 3 times its own weight of liquid and is relatively inexpensive. Tixosil 60® absorbs about twice its own weight of liquid. Silica gels for chromatography absorb between 1.5 and 2.5 times their own weight depending on their porosity.

Tixosil 68® is characterized by its low granulometry.

According to one particular embodiment of this invention, said amorphous silica gel is present in a quantity of between 5 and 90%, preferably between 30 and 85% and even more preferably between 50 and 80% by weight of the total weight of said composition.

(b) Cellulose Agent

The cellulose agent used in the composition according to the invention is cellulose or its derivatives.

According to one particular embodiment of this invention, said cellulose agent is derived from wood, straw or cotton. For example, the cellulose agent is chosen from among Jelucel HM 300® and Jelucel HM 200®.

Jelucel HM 300® is pure cellulose (CAS: 9004-34-6) with very small granulometry.

The cellulose agent used in the composition is not irritating and does not release any harmful gases during its use. Cellulose is not a product classified as carcinogenic, even in the form of dust. Therefore it is different from other wood derivative products such as sawdust, wood chips and wood powder, whose dustare classified by the IARC as being Class 1 CMR.

The cellulose agent according to this invention can efficiently absorb any type of liquid at very low cost, and particularly carbonaceous products. On the other hand, it tends to form a paste that sticks to the ground during depollution, and in particular reacts with sulphuric acid to form a sticky black oil through an exothermal reaction. It is not recommended for use alone.

The cellulose used was chosen as a function of its granulometry and therefore its capacity to granulate. If the granulometry of the cellulose is too small, there are severe risks of a powder explosion. If the granulometry of the cellulose is too large, it will form fibre agglomerates that disintegrate badly and therefore it is very difficult to obtain a homogeneous powder.

Jelucel HM 200® has a smaller granulometry than Jelucel HM 300®. Jelucel HM 300® has slightly better absorption capacities than Jelucel HM 200®.

The granulometry of the different celluloses that can be used is measured by sieving under an air flow.

According to one particular embodiment of this invention, said cellulose agent has a granulometry of 0 to 400 μm, preferably from 0 to 300 μm.

According to one particular embodiment of this invention, said cellulose agent is present in a quantity of between 2 and 60%, preferably between 10 and 55% and even more preferably between 15 and 45% by weight of the total weight of said composition.

(c) Binder

The composition according to the invention also comprises a binder chosen from among polymers derived from cellulose such as hypromellose and sodium carboxymethyl cellulose; polyvinylpyrrolidone, polyethylene glycol and gelatine, and mixtures thereof.

In particular, the binding agent is hypromellose (or hydroxypropyl methylcellulose, HPMC, E464) that is a polymer derived from cellulose that is used as a binder for granulation. For example, hypromellose is marketed under the name Arbocel CE 2910 HE 50 LV®.

Hypromellose is a non-irritant binder that is advantageous due to its low cost, its ability to form solid non-friable grains, its high solubility in water and its resistance to many chemicals.

The quantity of binder must be optimized to obtain efficient granulation. If the quantity of added binder is too small (<1% by mass), then the grains will be too friable and will disintegrate when vibrations are applied to them (for example vibrations due to transport). If the quantity of added binder is too large (>20% by mass), the manufacturing cost of the composition will be too high.

According to one particular embodiment of this invention, said binding agent is present in a quantity of 1 to 20%, preferably 2 to 10% and even more preferably 3 to 8% by weight of the total weight of said composition.

(d) Neutralising Agent

"Neutralising agent" means a compound capable of changing the pH of its surrounding environment to a pH of 5.5 to 9, even 6 to 8, and particularly 7.

The neutralisation capacity of a compound (or a composition), expressed in g/mol, corresponds to the quantity by mass of said compound (or said composition) that has to be added to 1 mole of strong acid or strong base so that the resulting pH is from 5.5 to 9, preferably from 6 to 8, and even more preferably equal to about 7.

Neutralising agents for acid liquids are bases for which the pKa is from 7 to 13, preferably from 8 to 12, and even more preferably from 9 to 10.

Neutralising agents for basic liquids are acids for which the pKa is from 2 to 7, and preferably from 3 to 6, and even more preferably from 4 to 5.

According to one particular embodiment of this invention, said neutralising agent is chosen from among sodium bicarbonate, potassium bicarbonate, disodium citrate, calcium carbonate, magnesium carbonate, magnesium oxide, sodium citrate such as monobasic sodium citrate, amino acids and their salts such as glycine, glutamic acid, sodium glutamate, sodium glutamine, succinic acid and mixtures thereof. Calcium carbonate, monobasic sodium citrate and mixtures thereof will be used in preference.

In case of depollution of acid liquids, in particular calcium carbonate, magnesium carbonate, magnesium oxide, amino acid salts and mixtures thereof will be used. It is preferred to use calcium carbonate.

Calcium carbonate is preferred because it has a neutralising power of 20 mol/kg, it is not irritant and it is not expensive.

Magnesium carbonate can be used but its neutralising capacity is not as good as calcium carbonate because the reaction rate is slower and the texture of the resulting product makes it difficult to collect.

Magnesium oxide is irritant, and amino acid salts are more expensive than calcium carbonate, this is why then can be used but they are not preferred.

When depolluting basic liquids, sodium citrate, amino acids such as glycine or glutamic acid and salts thereof such monobasic sodium glutamate, succinic acid and mixtures thereof in particular can be used. Monobasic sodium citrate is preferred.

According to one particular embodiment of this invention, said neutralising agent is present in a quantity of 0 to 85%, preferably 1 to 60% and even more preferably 15 to 40% by weight of the total weight of said composition.

(e) Additives

According to one particular embodiment of this invention, said composition may also include at least one additive chosen from among pH indicators, dyes, perfumes, flow-facilitating agents, swelling agents, disintegrants and mixtures thereof.

According to one particular embodiment of this invention, additives are present in a quantity of 0 to 5%, preferably 0.001 to 2% and even more preferably 0.05 to 1% by weight of the total weight of said composition.

pH Indicator

"pH indicator" refers to compounds capable of changing colour as a function of the pH of the environment.

Examples of pH indicators are thymol blue, tropaeolin, bromocresol purple, bromophenol blue, neutral red, phenolphthalein, thymolphthalein, alizarine R yellow, bromothymol blue, cresol red, methyl violet, malachite green, methyl yellow, congo red, methyl orange, bromocresol green, methyl red, phenol red, alizarine, indigo carmen and mixtures thereof.

Thus, according to one particular embodiment of this invention, the composition also comprises at least one pH indicator chosen from among tropaeolin, thymol blue, bromocresol purple, bromophenol blue, congo red, neutral red, phenolphthalein, thymolphthalein, alizarine R yellow and mixtures thereof.

The presence of a pH indicator makes a fast check of the pH of the residue possible so that necessary precautions can be taken with manipulation of the residue formed and also to assure that the waste can be treated as an OIW.

In one particular embodiment, when the composition according to the invention comprises a neutralising agent, it also comprises a pH indicator.

Dye

For example, a dye may be any dye without any toxicity, for example a food quality dye. Particular examples include Patent blue V, Carmoisine, etc.

Perfume

Perfumes may be of natural origin, such as essential oils from flowers, fruit, wood bark (cinnamon, sandalwood), resin (incense, myrrh), etc. Synthetic perfumes such as vanilline can also be used.

Flowing Agent

The composition according to the invention may include flow agents to facilitate spreading of the composition. Examples of such agents include sand, peat, etc.

Swelling Agent

Super-absorbent polymers such as sodium polyacrylate, potassium polyacrylate or polyamide or block copolymers of this type can be added to the composition to increase the capacity to absorb aqueous solutions. Examples of commercial products that can be used include particularly Aquakeep® and Tramfloc®.

Disintegrant

Disintegrants are additives that help pellets to disintegrate when they are brought into contact with a liquid.

Some examples of these disintegrants include, amongst other, pregelatinized starch, cross-linked sodium carboxymethylcellulose (croscarmellose) or cross-linked PVP (crospovidone).

According to one embodiment, the composition according to the invention comprises:
- from 40 to 90%, preferably from 50 to 85% and even more preferably from 55 to 80% by weight relative to the total weight of said composition of amorphous silica gel;
- from 5 to 60%, preferably between 10 and 55% and even more preferably from 15 to 45% by weight of the total weight of said cellulose agent composition,
- from 1 to 20%, preferably from 2 to 10% and even more preferably from 3 to 8% by weight relative to the total weight of said composition of binding agent; and
- from 0 to 5%, preferably from 0.001 to 2% and even more preferably from 0.05 to 1% by weight relative to the total weight of said composition of at least one additive.

According to another particular embodiment, the composition according to the invention comprises:
- from 70 to 80%, preferably from 74 to 77% and even more preferably about 76% by weight relative to the total weight of said composition of amorphous silica gel;
- from 15 to 25%, preferably from 18 to 20% and even more preferably about 19% by weight relative to the total weight of said cellulose agent composition, from 2 to 10%, preferably from 3 to 8% and even more preferably about 5% by weight relative to the total weight of said composition of binding agent; and from 0 to 5%, preferably from 0.001 to 2% and even more preferably from 0.05 to 1% by weight relative to the total weight of said composition of at least one additive.

According to another particular embodiment, the composition according to the invention comprises:

from 50 to 65%, preferably from 55 to 60% and even more preferably about 57% by weight relative to the total weight of said composition of amorphous silica gel;

from 30 to 45%, preferably from 32 to 40% and even more preferably about 38% by weight of the total weight of said cellulose agent composition;

from 2 to 10%, preferably from 3 to 8% and even more preferably about 5% by weight relative to the total weight of said composition of binding agent; and from 0 to 5%, preferably from 0.001 to 2% and even more preferably from 0.05 to 1% by weight relative to the total weight of said composition of at least one additive.

According to another particular embodiment, the composition according to the invention comprises:

from 5 to 60%, preferably from 6 to 30% and even more preferably from 7 to 15% by weight relative to the total weight of said composition of amorphous silica gel;

from 2 to 30%, preferably from 3 to 15% and even more preferably from 4 to 8% by weight of the total weight of said composition of cellulose agent;

from 2 to 10%, preferably from 3 to 8% and even more preferably from 3 to 6% by weight relative to the total weight of said composition of binding agent; and from 5 to 85%, preferably from 20 to 80% and even more preferably from 40 to 76% by weight relative to the total weight of said composition of neutralising agent; and from 0 to 5%, preferably from 0.001 to 2% and even more preferably from 0.05 to 1% by weight relative to the total weight of said composition of at least one additive, particularly a colour indicator.

The composition according to the invention can give an excellent compromise between the capacity to absorb aqueous compounds, the capacity to absorb organic compounds, low reactivity to chemicals, and neutralisation of acid-basic compounds.

This invention also relates to a method of manufacturing a solid composition comprising:

(a) at least one amorphous silica gel,
(b) at least one cellulose agent; and
(c) at least one binding agent, and
(d) optionally a neutralising agent, and characterized in that it has a granulometry from 100 µm to 2 mm.

According to one particular embodiment of this invention, the required granulometry of said composition is obtained by wet granulation.

Thus, according to one particular embodiment of this invention, the method of manufacturing said composition includes a step of wet granulation of amorphous silica gel, of the cellulose agent, optionally at least one neutralising agent and optionally at least one additive, in the presence of the binding agent.

Granulation is a particle agglomeration method designed to form larger particles called pellets, inside which the original particles are still identifiable.

In preferred embodiment, wet granulation is done by spraying said binding agent on a powder comprising said amorphous silica gel, said cellulose agent, optionally said neutralising agent and optionally at least one additive kept in movement by shaking devices such as rotary drums, fluidized beds, high speed mixers and other devices. The liquid initially binds the particles to each other by a combination of capillary and viscous forces, and then more permanent links are formed after drying. The properties of the pellets produced are determined by the type of formulation used and by the method chosen.

In this case granulation can avoid the formation of dust, facilitates flow during use and also makes the distribution of said composition on the pollutant uniform.

In one embodiment of the method according to the invention, wet granulation takes place in one or two steps.

According to one particular embodiment of this invention, said fabrication method includes a drying step and optionally a sieving step. Several drying methods can be envisaged: drying by air flow, by convection, by conduction, by radiation, by microwaves or by a pressure drop. Combinations of these different techniques can also be envisaged. The sieving step can obtain the granulometry chosen for the composition by eliminating the remaining fine particles that were not granulated or by eliminating grains that are too large.

The method of fabricating this composition is based on the following steps (indirect process):

1. Preparation of said binding agent in solution;
2. Mix said amorphous silica gel, said cellulose agent and optionally said neutralising agent to obtain a homogeneous powder;
3. Mix said binding agent in solution with said newly formed homogeneous powder;
4. Dry the wet mix obtained in step 3 to evaporate the solvent; and
5. Sieving step (optional).

A simpler fabrication method would also be possible (direct method):

1. Mix said binding agent, said amorphous silica gel, said cellulose agent and optionally said neutralising agent to obtain a homogeneous powder;
2. Add solvent to said newly formed homogeneous powder;
3. Dry said wet mix obtained to evaporate the solvent; and
4. Sieving step (optional).

Many solvents can be chosen for the wet granulation method. The use of water is preferred for economic and ecological reasons.

The quantity of solvent to be added can be optimized to obtain a homogeneous powder with the chosen granulometry.

The granulometry becomes larger as the volume of added solvent increases, until a paste is obtained.

If the volume of solvent is really too large (more than 2.5 L per kg of powder), then a homogeneous past will be obtained rather than separate pellets.

The paste will be better aerated and the granulometry of the finished product will become finer as the added solvent volume decreases. If the volume is really too small (less than 1 L per kg of powder) then not all the product will not be humidified and some of the powder will not be granulated.

In one particular embodiment, the quantity of solvent used for the wet granulation method is between 1 and 2.5 L, preferably between 1.2 and 2.3 L and even more preferably between 1.5 and 2.2 L per kg of powder.

In one preferred embodiment, the volume of solvent to be added is 1.8 litres of solvent per kg of total powder.

The proportion of raw materials and solvent and the chosen granulometry will be adapted to the final use of the product.

The solvent quantity necessary to obtain a granulometry of 100 μm to 1 mm is 1.5 L per kg of powder.

The solvent quantity necessary to obtain a granulometry of 1 mm to 2 mm is 2.2 L per kg of powder.

This invention also relates to the use of said composition to absorb aqueous compounds, organic compounds and chemicals.

In one particular embodiment, said composition is used to absorb spills of paint, stains, chemicals such as acids and bases, oils, hydrocarbons, solvents and aqueous products.

The invention non-limitatively relates to use of the composition according to the invention as multi-purpose absorbent, absorbent for paint or as a road absorbent.

A composition according to the invention with a granulometry of 160 μm to 355 μm will non-limitatively be used as a multi-purpose absorbent. Due to its small granulometry, this composition will be capable of absorbing any type of liquid product, particularly chemicals, at low cost and without causing any chemical reaction with liquid to be absorbed or with the environment. This composition also leaves a particularly dry and non-slippery ground surface after absorption of the liquid to be absorbed.

A composition according to the invention with a granulometry of 160 μm to 1 mm can non-limitatively be used as a paint absorbent. Due to its granulometry, this composition can efficiently absorb paint spills in large low-cost do-it-yourself stores without causing any chemical reaction with the liquid to be absorbed or chemicals usually used in large do-it-yourself stores. Furthermore, this composition is less drying which stops paint from sticking to the ground and does not leave a large stain that is difficult to remove.

A composition according to the invention with a granulometry of 355 μm to 2 mm can non-limitatively be used as a road absorbent. Due to its granulometry, this composition can efficiently absorb all types of liquid product (particularly chemicals, oils, aqueous products, hydrocarbons, etc.) without generating a chemical reaction with the liquid to be absorbed or the environment. Furthermore, the granulometry is chosen so that the composition can be used on roads and motorways.

The invention also relates to a depollution method using the composition according to the invention.

This method comprises the following steps:
(1) add the composition on a polluting liquid;
(2) wait until the polluting liquid has been absorbed;
(3) possibly check the pH of the residue obtained in step 2;
(4) repeat steps 1 to 3 until the polluting liquid has been completely absorbed and a solid residue has been formed; and
(5) collect the residue.

Step 1) can be performed in different ways depending on the scale of the pollution. For example, if it is laboratory scale pollution (of the order of a few hundred mL), step 1 can be done by adding a few tens of grams of composition, around or on the polluting liquid, while in the case of a larger scale pollution (for example such as a spill from a lorry carrying raw material), step 1 can be done by tipping for example from a tipper truck, or a fireman's hose, on or around the polluting liquid.

If the composition according to the invention comprises a pH indicator, the pH check in step 3) can be made visually. Therefore measures necessary for manipulation of the residue (wear gloves, goggles) and storage or final treatment conditions (ventilated hangar, burial, etc.) can be taken.

Once a solid residue has been obtained, the residue is collected using means routinely used by an expert in the field, for example using a shovel or by vacuum cleaning.

In one particular embodiment, the residue obtained in step (5) is an OIW residue.

The invention will now be illustrated by the following non-limitative examples.

EXAMPLES

The following commercial products are used in the examples given below:

Tixosil 68®: amorphous silica gel marketed by Solvay with an average granulometry of 200 μm and an apparent density of 300 kg/cm³.

Jelucel HM 300®: pure cellulose marketed by Jelu-Werk.

Hypromellose Arbocel CE 2910 HE 50 LV®: polymer derived from cellulose marketed by JRS.

Jelucel HM 300® granulometry data supplied by the manufacturer are given in Table 1.

TABLE 1

| Sieve size | Residual percent by mass on the sieve |
|---|---|
| 32 μm | 60- |
| 100 μm | 20% |
| 300 μm | 2% |

Therefore JELUCEL HM 300® cellulose has the following properties:

TABLE 2

| Grain size | Percent by mass |
|---|---|
| Between 0 μm and 32 μm | 40% |
| Between 32 μm and 100 μm | 40% |
| Between 100 μm and 300 μm | 18% |
| More than 300 μm | 2% |

Jelucel HM 200® was also tested. Jelucel HM 200® is finer and its granulometry is as follows:

| Grain size | Percent by mass |
|---|---|
| Between 0 μm and 32 μm | 45% |
| Between 32 μm and 100 μm | 42% |
| Between 100 μm and 200 μm | 11% |
| More than 200 μm | 2% |

Example 1 (Use of the Solid Composition as Multi-Purpose Absorbent)

A solid depollution composition comprising Tixosil 68®, Jelucel HM 300® and Hypromellose Arbocel CE 2910 HE 50 LV® in a mass ratio equal to 76/19/5 and with granulometry from 160 μm to 355 μm, is prepared as follows:

1 kg of said composition is fabricated by an indirect granulation method (in two steps) as follows:
add 760 g of Tixosil 68® amorphous silica gel in a mixer,
add 190 g of Jelucel HM 300® cellulose,
the two compounds are mixed until a homogeneous powder is obtained, prepare a solution containing 50 g of hypromellose Arbocel® CE 2910 HE 50 LV in 1.8 L of water at 50° C.,
homogenize this solution to obtain a viscous yellow translucent liquid,
add this binding agent in solution onto the homogenized powder,
mix until the solvent and the powder are completely homogenized (until a granulated paste is obtained),
dry the mixture at 80° C. in a ventilated drying oven and mix very slowly for 24 h,
sieve the pellets by vibration using a sieve with a mesh size smaller than 160 μm and a sieve with a mesh size larger than 355 μm, and
recover the fraction between 160 μm and 355 μm.

Absorption Tests

Different absorption tests were made independently with the following liquids to be depolluted: water, 5N hydrochloric acid, 5N soda, engine oil, diesel fuel, ethanol at 95%, hydrochloric acid at 37%, caustic soda at 50%, Javel water at 13%, using the solid composition prepared above.

For each absorption test, the solid composition is poured on 1 L of liquid to be depolluted until the liquid pollutant has been fully absorbed and a solid residue has been formed. The quantity of solid composition used is then measured. The results are given in the following table:

| Multi-purpose absorbent | |
|---|---|
| Granulometry | from 160 μm to 355 μm |
| Density | 235 g/L |
| Absorption capacity (mass of absorbent necessary to absorb 1 L of liquid): | |
| Water | 300 g |
| 5N hydrochloric acid (HCl) | 315 g |
| 5N soda (NaOH) | 330 g |
| Engine oil | 360 g |
| Diesel fuel | 280 g |
| 95% ethanol (EtOH) | 270 g |
| 37% hydrochloric acid | 320 g |
| 50% caustic soda | 340 g |
| 13% Javel water | 380 g |

Therefore the composition used has the advantage that it absorbs all spilled liquids at low cost. This composition can be used on all spilled liquids except for ultra concentrated strong oxidants. The large granulometry of said composition means that no breathing difficulties are provoked for the user. This composition has a much lower dust emission ratio than the usual Polycaptor® absorbent.

Example 2 (Use of the Composition as Absorbent for Paint)

A solid depollution composition comprising Tixosil 68®, Jelucel HM 300® and Hypromellose Arbocel CE 2910 HE 50 LV® in a mass ratio equal to 57/38/5 and with granulometry from 160 μm to 1 mm, was prepared as follows:
1 kg of said composition is fabricated by a direct granulation method as follows:
add 570 g of Tixosil 68® amorphous silica gel in a mixer,
add 380 g of Jelucel HM 300® cellulose,
add 50 g of hypromellose Arbocel CE 2910 HE 50 LV®,
the three compounds are mixed until a homogeneous powder is obtained,
add 1.8 L of water at 50° C. on this homogeneous powder, water thus acting as a solvent,
mix until total homogenisation of the solvent and the powder (until a granulated paste is obtained),
dry under air flow while slowly mixing for 24 h,
sieve the pellets by vibration using a sieve with a mesh size smaller than 160 μm and a sieve with a mesh size larger than 1 mm, and
recover the fraction between 160 μm and 1 mm.

Absorption Tests

Different absorption tests were made independently with the following liquids to be depolluted: water, engine oil, gasoline, acrylic paint, stain, alkyd polyurethane paint, using the solid composition prepared above.

For each absorption test, the solid composition is poured on 1 L of liquid to be depolluted until the liquid pollutant has been fully absorbed and a solid residue has been formed. The quantity of solid composition used is then measured. The results are given in the following table:

| Absorbent for paint | |
|---|---|
| Granulometry | from 160 μm to 1 mm |
| Density | 200 g/L |
| Absorption capacity (mass of absorbent necessary to absorb 1 L of liquid) | |
| Water | 330 g |
| Engine oil | 345 g |
| Gasoline | 280 g |
| Acrylic paint | 360 g |
| Stain | 440 g |
| Alkyd polyurethane paint | 380 g |

Therefore the major advantage of the composition used is to efficiently absorb water-based paints, solvent-based paints and varnishes. The composition used is optimized to efficiently dry the paint or varnish and therefore obtain a non-slippery and safe ground surface, while guaranteeing efficient absorption. This composition is not reactive towards most chemical products sold to the general public. The large granulometry of this composition means that no breathing difficulties are provoked for the user.

Example 3 (Use of the Composition as Absorbent for Roads)

A solid depollution composition comprising Tixosil 68®, Jelucel HM 300® and Hypromellose Arbocel CE 2910 HE 50 LV® in a mass ratio equal to 76/19/5 and with granulometry ranging from 355 μm to 2 mm, was prepared as follows:
1 kg of said composition is fabricated by a direct granulation method as follows:
add 760 g of amorphous silica gel Tixosil 68® in a mixer,
add 190 g of cellulose Jelucel HM 300®,
add 50 g of hypromellose Arbocel CE 2910 HE 50 LV®,
the three compounds are mixed until a homogeneous powder is obtained,
add 2 L of water at 50° C. as solvent on this homogeneous powder,
mix until total homogenisation of the solvent and the powder (until a granulated paste is obtained),
dry the mix at 80° C. in ventilated drying oven and mix very slowly for 24 h,
sieve the pellets by vibration using a sieve with a mesh size smaller than 355 μm and a sieve with a mesh size larger than 2 mm, and
recover the fraction between 355 μm and 2 mm.

Example 4 (Use of the Composition as Special Acid Absorbent for Roads)

A solid depollution composition is prepared in the same way as in example 3 with the following composition:

130 g of amorphous silica gel Tixosil 68®,
60 g of cellulose Jelucel HM 300®,
49.7 g of hypromellose Arbocel CE 2910 HE 50 LV®,
560 g of sodium bicarbonate,
200 g of calcium carbonate,
0.2 g of tropaeolin, and
0.1 g of thymol blue.

Example 5 (Use of the Composition as Special Base Absorbent for Roads)

A solid depollution composition is prepared in the same way as in example 3 with the following composition:
80 g of amorphous silica gel Tixosil 68®,
50 g of cellulose Jelucel HM 300®,
35.7 g of hypromellose Arbocel CE 2910 HE 50 LV®,
441 g of sodium bicarbonate,
393 g of glycine,
0.2 g of tropaeolin, and
0.1 g of thymol blue.

Example 6 (Use of the Composition as Special Base Absorbent for Roads)

A solid depollution composition is prepared in the same way as in example 3 with the following composition:
150 g of amorphous silica gel Tixosil 68®,
62.5 g of cellulose Jelucel HM 300®,
37.2 g of hypromellose Arbocel CE 2910 HE 50 LV®,
187.5 g of sodium bicarbonate,
562.5 g of monobasic sodium citrate,
0.2 g of tropaeolin, and
0.1 g of thymol blue.

Absorption Tests

Different absorption tests were performed independently with the following liquids: water, 5N hydrochloric acid, 5N soda, engine oil, gasoline, using the composition prepared in example 3.

For each absorption test, the solid composition is poured on 1 L of liquid to be depolluted until the liquid pollutant has been fully absorbed and a solid residue has been formed. The quantity of solid composition used is then measured. The results are given in the following table:

| Absorbent: road (Example 3) | |
| --- | --- |
| Granulometry | from 355 µm to 2 mm |
| Density | 166 g/L |
| Absorption capacity (mass of absorbent necessary to absorb 1 L of liquid) | |
| Water | 330 g |
| 5N hydrochloric acid | 330 g |
| 5N soda | 330 g |
| Engine oil | 400 g |
| Gasoline | 300 g |

This depollution composition can be used in an outdoor environment. Its granulometry makes it less sensitive to external elements such as wind and does not cause the formation of dust during use and therefore there is no breathing difficulty for its user. It can be used on all spilled liquids except for ultra concentrated strong oxidants).

Absorption tests are also carried out as described above with the special acid absorbent for roads in example 4.

For these tests, the mass of absorbent necessary to absorb 1 L of 5N hydrochloric acid is measured.

Good results are obtained.

The residue formed after absorption of 5N hydrochloric acid is irreversibly a yellow colour. Therefore an OIW residue is obtained.

Absorption tests are also carried out as described above with the special base absorbent for roads in example 5. For these tests, the mass of absorbent necessary to absorb 1 L of 5N soda is measured.

Good results are obtained.

The residue formed after absorption of 5N soda is irreversibly a yellow colour. Therefore an OIW residue is obtained.

Absorption tests are also carried out as described above with the special base absorbent for roads in example 6. For these tests, the mass of absorbent necessary to absorb 1 L of 5N soda is measured.

Good results are obtained.

The residue formed after absorption of 5N soda is irreversibly a yellow colour. Therefore an OIW residue is obtained.

Example 7 (Comparison with Sepiolite and Unsafe®)

Different absorption tests were carried out independently with the following liquid pollutants, for comparison purposes: 37% HCl, 50% caustic soda, water, 13% Javel water, 5N HCl, 5N NaOH and EtOH, using firstly the composition from example 1 and secondly using sepiolite and Unisafe®, according to the following protocol:

1) 1 L of liquid to be depolluted is put into a glass receptacle;

2) 5 g of the composition is added into said receptacle. Once the mixture has been homogenized, the state (liquid or solid) of the mixture is verified.

3) Steps 1) and 2) are repeated until a solid residue is obtained; and

4) Once a solid residue has been obtained, said residue is collected with a shovel.

The results of the absorption test are given in the following table.

| | Absorption capacity (mass of absorbent necessary to absorb 1 L of liquid) | | | | | | |
| --- | --- | --- | --- | --- | --- | --- | --- |
| | HCl 37% | Caustic soda 50% | Water | 13% Javel water | HCl 5N | NaOH 5N | EtOH |
| Composition in example 1 | 320 g | 340 g | 300 g | 380 g | 315 g | 330 g | 270 g |
| Sepiolite | 1480 g | 1360 g | 800 g | 1680 g | 940 g | 960 g | 1340 g |
| Unisafe ® | 660 g | 540 g | 300 g | 600 g | 600 g | 360 g | 760 g |

It should be noted that regardless of the pollutants and their concentrations, the compositions according to this invention have a better absorption capacity than products marketed at the present time.

Furthermore, the treatment cost using the composition according to the invention is considerably lower than the treatment cost using currently marketed compositions.

In conclusion, the composition can absorb different liquid pollutants at different concentrations using a minimum quantity of product, at a lower cost than currently marketed products. Furthermore, the composition is not hazardous (non-toxic, non-irritating, non-allergic, and non-ecotoxic), unlike some products currently marketed. Furthermore, the specific granulometry of the composition according to this invention makes it less sensitive to external elements such as wind and does not cause the formation of dust during use and therefore does not lead to a breathing difficulty for its user. This composition specific to the chosen granulometry also absorbs pollutants more efficiently, simply leaving a thinner residual layer of liquid on the polluted surface. The quantity of residue formed is smaller than with currently marketed products, thereby reducing the environmental impact caused by this depollution. Moreover, this invention can give an easily collected residue and the depolluted surface is less slippery.

The invention claimed is:

1. A solid composition comprising:
   (a) at least one amorphous silica gel,
   (b) cellulose, and
   (c) at least one binding agent
   wherein the solid composition has a granulometry ranging from 100 μm to 2 mm,
   the binding agent being chosen from a list consisting of hypromellose, sodium carboxymethyl cellulose, polyvinylpyrrolidone, polyethylene glycol and gelatine, and mixtures thereof, and
   the binding agent being present in a quantity of between 2 and 10% by weight of the total weight of said composition,
   wherein the amorphous silica gel is present in a quantity of between 50 and 85% by weight of the total weight of said composition.

2. The composition according to claim 1, having an absorption capacity of 1 L to 5 L for 1 kg of said composition.

3. The composition of claim 2, having an absorption capacity from 1.5 L to 4.5 L for 1 kg of said composition.

4. The composition according to claim 1, wherein the cellulose is present in a quantity of between 2 and 60% by weight of the total weight of said composition.

5. The composition according to claim 4, wherein the cellulose is present in a quantity of between 10 and 55% by weight of the total weight of said composition.

6. The composition according to claim 4, wherein the cellulose is present in a quantity of between 15 and 45% by weight of the total weight of said composition.

7. The composition according to claim 1, further comprising at least one additive chosen from among pH indicators, dyes, perfumes, flow-facilitating agents, swelling agents, disintegrants and mixtures thereof.

8. The composition according to claim 1, further comprising a neutralising agent chosen from among the group comprising sodium bicarbonate, potassium bicarbonate, disodium citrate, calcium carbonate, magnesium carbonate, magnesium oxide, sodium citrate, amino acids, and their salts such as sodium glutamate, sodium glutamine, succinic acid and mixtures thereof.

9. The composition according to claim 1, further comprising a pH indicator and a neutralising agent.

10. A depollution method using the composition as defined in claim 1, comprising the following steps:
    (1) add the composition on a polluting liquid;
    (2) wait until the polluting liquid has been absorbed;
    (3) optionally check the pH of the residue obtained in step 2;
    (4) repeat steps 1 to 3 until the polluting liquid has been completely absorbed and a solid residue has been formed; and
    (5) collect the residue,
    said polluting liquid being chosen from paints, stains, chemicals, oils, hydrocarbons, solvents, aqueous products and mixture thereof.

11. The depollution method according to claim 10, wherein the residue obtained in step (5) is a residue classified as non-hazardous waste.

12. The method in claim 10, wherein, said polluting liquid being chosen from paints, stains, chemicals, oils, hydrocarbons, solvents, and mixture thereof.

13. The solid composition of claim 1, further comprising at least one neutralizing agent.

14. A solid composition comprising:
    (a) at least one amorphous silica gel,
    (b) cellulose, and
    (c) at least one binding agent
    wherein the solid composition has a granulometry ranging from 100 μm to 2 mm,
    the binding agent being chosen from a list consisting of hypromellose, sodium carboxymethyl cellulose, polyvinylpyrrolidone, polyethylene glycol and gelatine, and mixtures thereof, and
    the binding agent being present in a quantity of between 2 and 10% by weight of the total weight of said composition,
    having an absorption capacity from 2 L to 4 L for 1 kg of said composition.

15. A solid composition comprising:
    (a) at least one amorphous silica gel,
    (b) cellulose, and
    (c) at least one binding agent
    wherein the solid composition has a granulometry ranging from 100 μm to 2 mm,
    the binding agent being chosen from a list consisting of hypromellose, sodium carboxymethyl cellulose, polyvinylpyrrolidone, polyethylene glycol and gelatine, and mixtures thereof, and
    the binding agent being present in a quantity of between 2 and 10% by weight of the total weight of said composition,
    wherein the amorphous silica gel is present in a quantity of between 55 and 80% by weight of the total weight of said composition.

\* \* \* \* \*